J. B. CANDY.
Attachment to Lathes for Cutting Rubber and Other Rings.

No. 208,567. Patented Oct. 1, 1878.

WITNESSES:
A. Schehl.
C. Sedgwick

INVENTOR:
J. B. Candy
BY Munn & Co.
ATTORNEYS.

UNITED STATES PATENT OFFICE.

JOHN B. CANDY, OF TRENTON, NEW JERSEY.

IMPROVEMENT IN ATTACHMENTS TO LATHES FOR CUTTING RUBBER AND OTHER RINGS.

Specification forming part of Letters Patent No. 208,567, dated October 1, 1878; application filed September 11, 1878.

*To all whom it may concern:*

Be it known that I, JOHN B. CANDY, of Trenton, in the county of Mercer and State of New Jersey, have invented a new and useful Improvement in Attachments to Lathes for Cutting Rubber or other Rings, of which the following is a specification:

In cutting rubber rings for packing for fruit-jar covers and for various other purposes the rings are cut from a rubber tube carried by a wooden mandrel rotated between lathe-centers by a cutting-tool carried by a tool-rest arranged to move parallel with the length of the tube, and the tool-rest is fitted so as to be moved to and from the tube that is to be cut. Heretofore no provision has been made for insuring accuracy of the distance traveled by the tool-rest between each cut, and the result has been a lack of uniformity in the width of the rings.

The object of my invention is to insure uniformity in the width of the rings and to provide for cutting them of any desired thickness.

My invention consists in the employment, in connection with a lathe, of a ratchet and pawl operated by the motion of the tool-rest, as more particularly hereinafter described, whereby the slide that carries the tool-rest is caused to travel the exact distance required after each cut; also, in means for adjusting the connections to the ratchet-and-pawl mechanism, whereby the distance traveled by the slide, and consequently the width of the rings cut off, is regulated.

Figure 1:
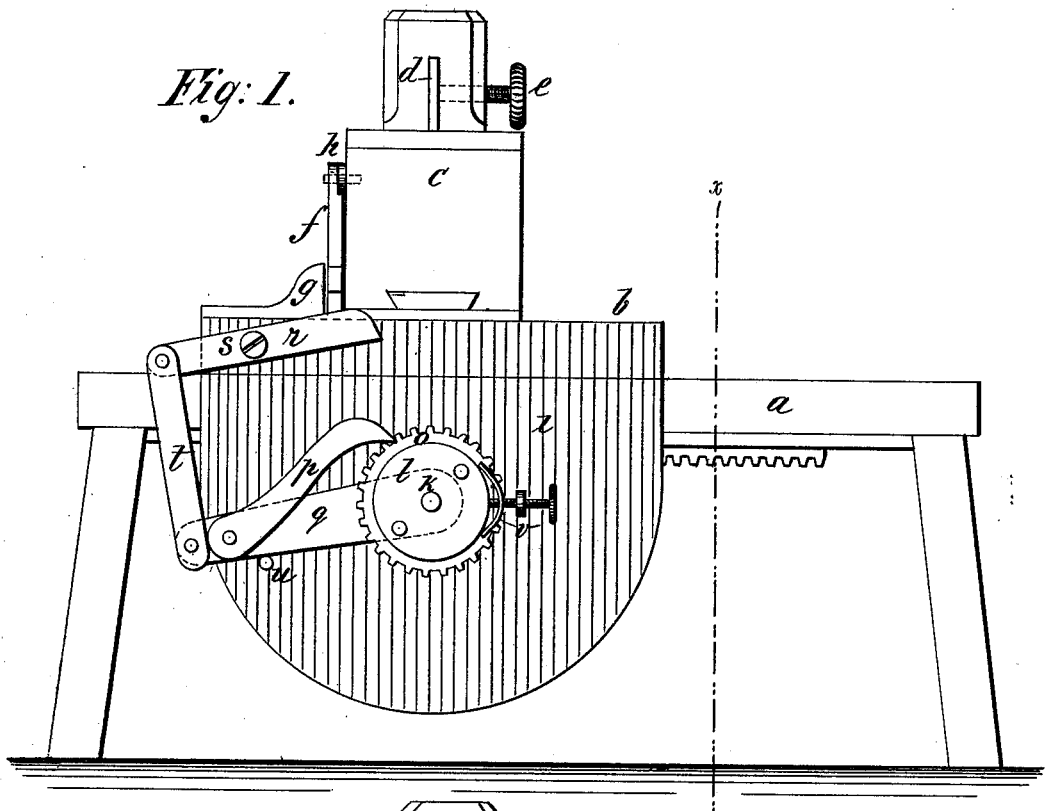
Figure 2:
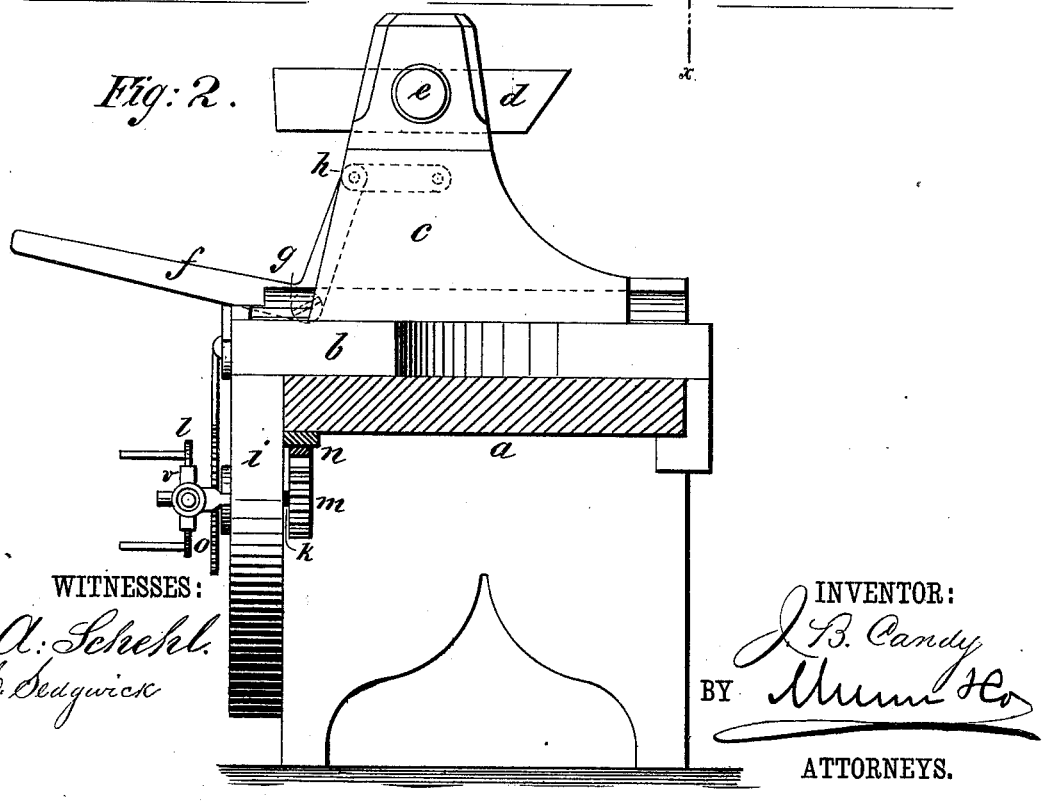

In the accompanying drawing, Figure 1 is a front elevation of a lathe-bed, tool-slide, and rest with my improvements applied thereto; and Fig. 2 is a cross-section of the same at the line $x\ x$.

Similar letters of reference indicate corresponding parts.

$a$ represents a lathe-bed of any desired or usual character. $b$ is a slide fitted to traverse the bed $a$ in a direction parallel with the mandrel (not shown) that carries the rubber tube, and is held between the lathe-centers. $c$ is the tool rest or holder, fitted to move upon the slide $b$ to and from the rubber tube, and carrying a cutting-tool, $d$, that is held in place by a screw, $e$.

The tool-holder $c$ is moved by an elbow-lever, $f$, fulcrumed at $g$ on the slide $b$, and connected by a link, $h$, with the tool-holder $c$. The long arm of lever $f$ projects in front of the bed $a$, and is raised or lowered to operate the tool-holder. $i$ is a plate projecting downward from the slide $b$ in front of bed $a$, in which plate is fitted an arbor, $k$. On the outer end of arbor $k$ is a hand-wheel, $l$, and on the inner end of the arbor, beneath bed $a$, is a pinion, $m$, that meshes with the rack $n$ on the under side of bed $a$, so that by turning wheel $l$ the slide $b$ may be moved upon the bed.

The parts above described are substantially the same as those in common use. The slide $b$ was moved by turning the hand-wheel after each cut, and, the distance being guessed at, there was no uniformity in the width of the rings.

In carrying out my improvements I provide a ratchet-wheel, $o$, that is keyed to the arbor $k$ in front of the plate $i$, and a pawl, $p$, hung on an arm, $q$, that works loosely on shaft $k$.

$r$ is a lever pivoted on a screw-pin, $s$, on the slide $b$. $t$ is a link connecting the outer end of lever $r$ with the free end of the pawl-carrying arm $q$. The downward motion of the arm $q$ is limited by a pin, $u$, on plate $i$. When the arm $q$ rests upon pin $u$ the inner end of lever $r$ is raised in a position where it will be acted upon and depressed by the end of the lever $f$ when said lever $f$ is pressed down to withdraw the tool. This motion of the lever $r$ acts by the pawl $p$ to move the ratchet-wheel, and consequently the slide $b$, a certain distance lengthwise of bed $a$, so that when the lever $f$ is raised to force the tool-holder inward a ring will be cut of a width equal to the distance moved by the slide. This operation is continued, and the rings thereby cut of uniform width. The lever $r$ will be returned to position by gravity as soon as lever $f$ is raised.

By changing the fulcrum of lever $r$, a number of holes being provided in slide $b$ for that purpose, or by changing the position of the pin $u$, the distance moved by the pawl $p$ upon the ratchet will be varied, and the movement of the slide $b$ between each cut proportionately changed.

$v$ is a friction-brake bearing upon the hand-wheel *l* to prevent any movement by momentum of the parts.

I do not limit myself to the exact details of construction, as they may be varied without departing from my invention.

Having thus described my invention, what I claim as new, and desire to secure by Letters Patent, is—

1. In a lathe for cutting rubber or other rings, mechanism operated simultaneously with the movement of the tool-holder to impart a regular and uniform motion to the slide longitudinally of the bed, substantially as described.

2. In combination with a lathe for cutting rubber or other rings, the ratchet-wheel *o*, pawl *p*, arm *q*, and lever or levers, substantially as and for the purposes described.

JOHN B. CANDY.

Witnesses:
   J. D. JOSLIN,
   JOSIAH HOLLIES.